Nov. 23, 1943.  W. S. LANDON  2,335,212
HEATING APPARATUS
Filed Dec. 11, 1939  2 Sheets-Sheet 2
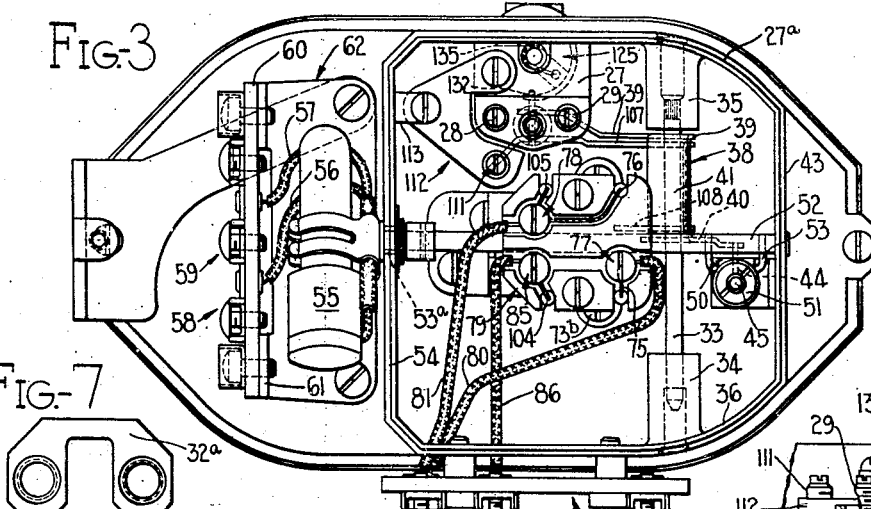
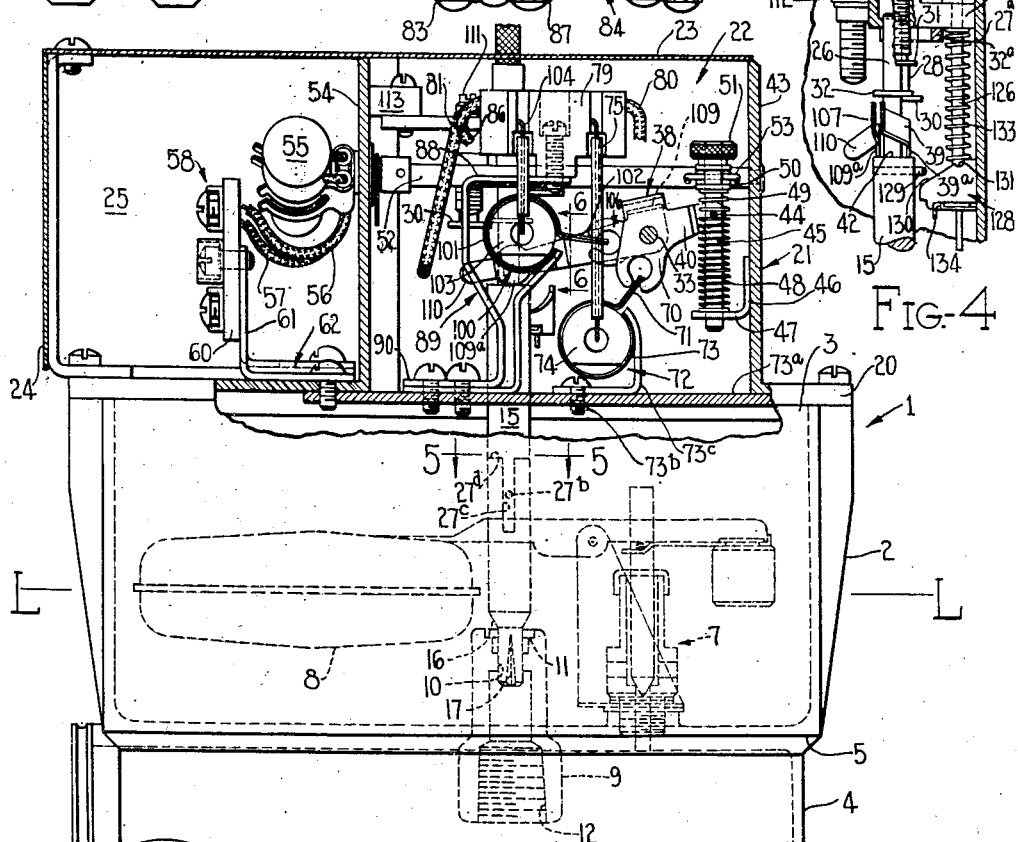
INVENTOR
Walter S. Landon
BY Andrew K. Fowler
his ATTORNEY Patented Nov. 23, 1943

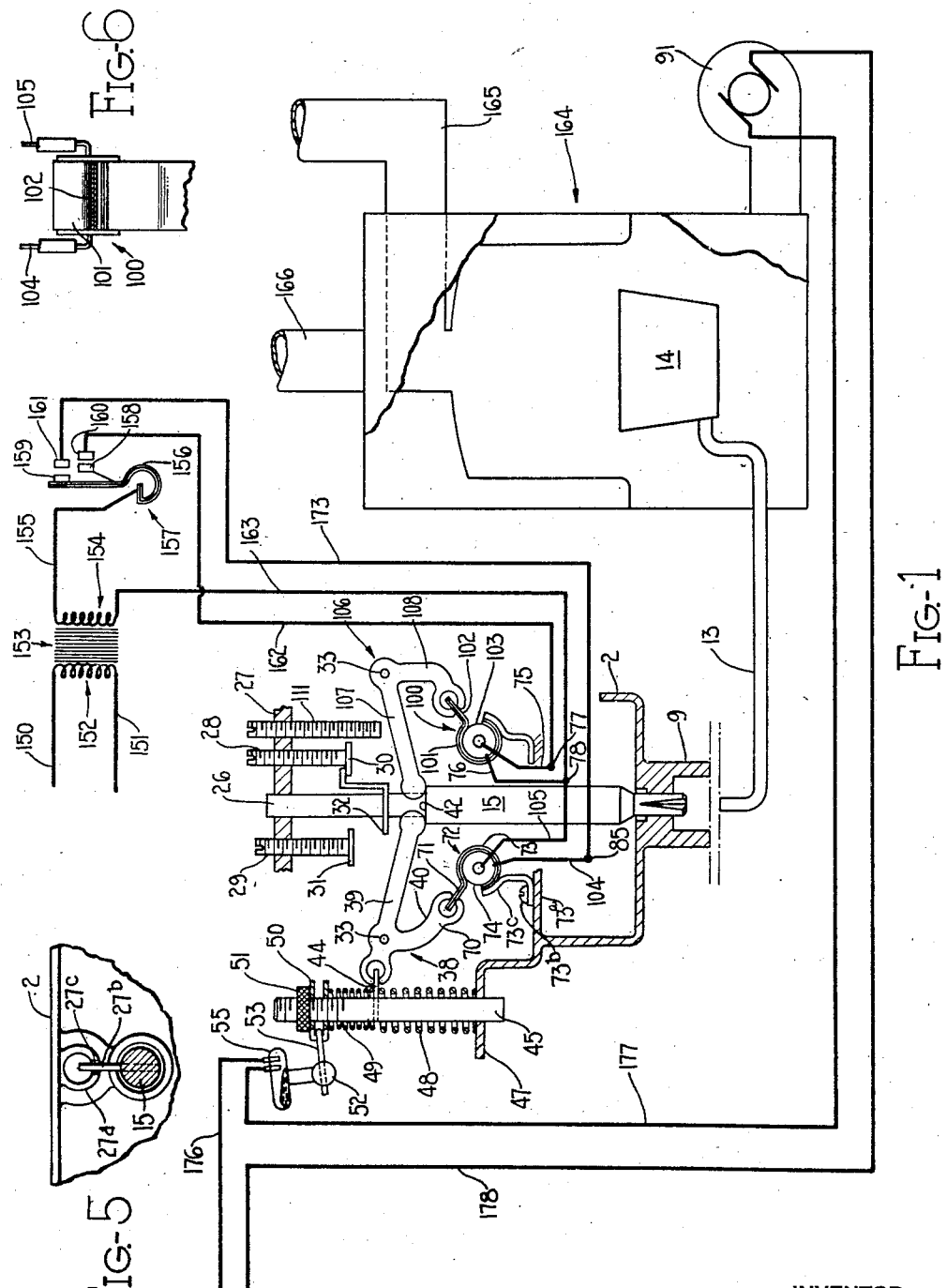

2,335,212

UNITED STATES PATENT OFFICE 2,335,212

HEATING APPARATUS

Walter S. Landon, Detroit, Mich., assignor to Detroit Lubricator Company, Detroit, Mich., a corporation of Michigan Application December 11, 1939, Serial No. 308,583

24 Claims. (Cl. 236—1)

This invention relates generally to heating apparatus and more specifically to the modulating type of apparatus which is applicable among other uses to control the flow of liquid fuel to an hydroxylation type burner.

An object of the invention is to provide means for controlling a heating apparatus in accordance with variations in temperature of the heated medium.

Another object is to provide a new and novel means for controlling an oil burner whereby its output is varied in steps.

Another object is to provide a new and novel heat actuated power element.

Another object is to provide means for manually controlling the apparatus, and which means returns to inactive position upon resumption of the automatic means.

The invention consists in the improved construction and combination of parts, to be more fully described hereinafter and the novelty of which will be particularly pointed out and distinctly claimed.

In the accompanying drawings, to be taken as a part of this specification, I have fully and clearly illustrated my invention, in which drawings—

Figure 1 is a schematic view of the control apparatus embodied in a heating system;

Fig. 2 is a view in side elevation of the apparatus with parts broken away;

Fig. 3 is a view in top elevation of the apparatus with the cover removed;

Fig. 4 is a view of a portion of the apparatus showing the method of connecting the lever members to the valve stem, and showing the manual operating means for the valve member;

Fig. 5 is a view substantially along the line 5—5 of Fig. 2 and looking in the direction of the arrows;

Fig. 6 is a partial view substantially along the line 6—6 of Fig. 2 and looking in the direction of the arrows, and Fig. 7 is a detailed view of the stop member holding means.

Referring to the drawings by characters of reference, the numeral 1 designates generally my control apparatus. The apparatus 1 comprises a lower chambered casing 2 having an open top wall 3 and having a hollow tubular strainer chamber 4 cast integral with its lower wall 5. The strainer chamber 4 has an inlet 6 at one end portion thereof and an outlet at its other end portion which leads to the interior of the casing 2. A valve mechanism 7, actuated by a float means 8, controls flow of fluid from the strainer chamber 4 to the casing 2 and acts to maintain a substantially constant predetermined liquid level within the chamber 4. A hollow outlet boss 9 through the lower wall 5 has an outlet port 10 and a valve seat 11 and is internally threaded, as at 12, adjacent its exterior end to receive an outlet conduit 13 for flow of fluid to the fuel burner or burner vessel 14. Fluid flow through the port 10 is controlled by a valve member 15 which extends upwardly within the casing 2, through its top wall 3, and has a lower end portion comprising a seating part 16 and a V-shaped, flow controlling port 17 which co-operates with the outlet port 10 to control the rate of flow of liquid from the casing 2 to the burner 14. A cover member 20 secured to the top of the casing 2 forms a cover therefor and an upwardly extending tubular wall 21 of the member 20 defines a chamber 22. The chamber 22 has its open top wall closed by a cover member 23, which cover member 23 has a downwardly extending flange portion 24 for cooperation with the first cover member 20 to define a second chamber 25. A reduced diameter end portion 26 of the valve member 15 is located in the chamber 22 and is guided for reciprocal movement in an apertured flange 27 extending inwardly into the chamber 22 from a side wall 27$^a$. Rotation of the valve member 15 is prevented by a pin 27$^b$ which reciprocates in a slot 27$^c$ of an inwardly extending wall portion 27$^d$ of the side wall of the chamber casing 2. The flange 27 has screw-threaded therein a pair of stop members 28, 29 which extend downwardly from the lower flange surface within the chamber 22 and substantially parallel to the valve member 15. The members 28, 29 have flanges 30, 31 respectively which engage a protuberance 32 on the valve member 15 to limit its vertical reciprocal movement. A U-shaped, friction holding member 32$^a$ is positioned adjacent the underface of the flange 27 and has a pair of threaded apertures, one in each leg, through which the members 28, 29 are threaded. The apertures in the legs of the holding member 32$^a$ are constructed and arranged so that when the member 32$^a$ is in its inert state, the center lines of the apertures are slightly closer together than the centerlines of the members 28, 29. For example, when the members 28, 29 have a $\frac{1}{4}$-40 thread and are spaced about $\frac{1}{16}$ of an inch, on centers, the center line distance of the apertures in the member 32$^a$ should be about .010 inch less than 1/16". The arms of the member 32ᵃ must therefore be spread apart from their inert positions in order for the apertures therethrough to register concentrically with the members 28, 29. The resilience of the base or connecting portion between the arms of member 32ᵃ therefore stresses the members 28, 29 against the side walls of their bores in flange 27 to frictionally hold the members 28, 29 in adjusted position.

A rod or fulcrum member 33 has its opposite ends secured within bosses 34, 35 which extend inwardly into the chamber 22 from a side wall 36 thereof, and from the wall 27ᵃ. A lever member 38 comprises a pair of arms 39, 40 joined together at their top edge portions by a cross member 41. The arms 39, 40 have aligned apertures therethrough which receive the rod 33 and pivotally support the lever member 38. The arm 39 has a circular portion 39ᵃ which is positioned intermediate the protuberance 32 and a shoulder 42 formed on the valve member 15, at the intersection of the upper end portion 26 and the full-sized stem portion of the member 15. As the lever member 38 is rotated clockwise (see Fig. 2) on the rod 33, the circular portion 39ᵃ engages the protuberance 32 to vertically lift the valve member 15. The arm 40 extends on the opposite side of the rod 33 and toward an end wall 43 of the chamber 22 and is apertured to receive a pin 44 carried in a vertically reciprocal rod 45. The rod 45 is guided at its lower end within an aperture extending through an L-shaped supporting member having one leg 46 secured to wall 43 and the other leg 47 extending perpendicularly thereto, the leg 47 also serving as an abutment for the lower end of a helical coil compression spring 48. The spring 48 has its upper end engaging and held under compression against the pin 44 and so that it acts to exert a force to urge the rod 45 in an upwardly direction. A second helical coil compression spring 49 concentric with and surrounding rod 45 has its lower end portion abutting the pin 44 and has its upper end engaging the underside of the lower leg of a U-shaped member 50. The member 50 has aligned apertures through the parallel legs which receive and are free to move along the axis of the pin 44. The member 50 is held in adjusted position against the spring 49 by a nut adjustment member 51 threaded on the upper end of the rod 45. In this manner the member 50 is held in any adjusted position relative to the pin 44 and yet, due to the expansive force exerted by the spring 49, the member 50 will move in response to movement of the pin 44 by the lever member 38. Movement of the pin 44 is transmitted to a horizontally extending shaft 52 by a second U-shaped member 53 having its parallel arms radially secured to and in alignment with the horizontal axis of the shaft 52. The members 50 and 53 therefore form a link connecting the rod 45 to the shaft 52 so that reciprocal movement of the rod is transmitted to the shaft as rotary movement. The shaft 52 having one end journaled in the end wall 43 extends centrally parallel to and between the side walls 36, 27ᵃ, and has its other end portion 53ᵃ journaled in and extending through an opposite end wall 54 of the chamber 22. The end portion 53ᵃ extending beyond the wall 54 is positioned within the chamber 25 and carries a mercury tube switch 55 at right angles to the axis of the shaft 52 and is so positioned that upon rotation of the shaft 52 by the rod 45 the switch is moved into or out of circuit making position. Flexible lead wires 56, 57 connect the switch 55 to binding posts 58, 59 respectively of a terminal strip 60. The strip 60, which is made of a suitable electric insulating material, such as Bakelite, is supported within the chamber 25 by a vertically extending portion 61 of a plate member 62 secured, as by screws, to the cover member 20.

The lever member arm 40 has an apertured or bifurcated portion 70 for reception of a lip 71 of a bimetallic power element 72. The spring 48 urges one edge portion of the arm 40 against the element 72 to prevent any lost motion between the arm 40 and the lip 71. The element 72, which operates under high-fire conditions, to be hereinafter described, comprises the lip 71 and a cylindrical portion 73. The portion 73 is not closed but has its side wall split longitudinally and the lip connected thereto so that the lip extends radially outward from the portion 73 adjacent the split. A plate member 73ᵃ is secured to and closes an aperture through the cover member 20 which connects the interior of the member 2 to the chamber 22. The member 73ᵃ has secured thereto, as by screws 73ᵇ, an L-shaped supporting member 73ᶜ. The element 72 is secured adjacent the split of the portion 73 and on the opposite side thereof from the lip 72 by the supporting member 73ᶜ. The element 72 is heated by a suitable electrical heating unit 74 which is cylindrical in form and is positioned within and substantially fitting the interior of the portion 73. The heating unit 74 has its lead wires 75, 76 extending upward, one from each end of the unit 74, toward the cover member 23 and connected to binding posts 77, 78 respectively. The posts 77, 78 are carried by a Bakelite terminal block 79. The block 79 is positioned for convenience just beneath the cover member 23 so that upon removal of the member 23 the binding posts 77, 78 will be in a convenient location for connection of lead wires 80, 81. The posts 77, 78 are connected respectively to a pair of vertically aligned binding posts 83 carried by a Bakelite terminal strip 84 by the lead wires 80, 81. The strip 84 is positioned external of the control apparatus and is carried by the wall 36. The block 79 also has a binding post 85, situated similarly to the posts 77, 78, which is connected by a lead wire 86 to a binding post 87 carried by the strip 84 adjacent posts 83. The block 79 is carried by the upper horizontal leg 88 of a Z-shaped member 89 which has its lower horizontal leg 90 secured as by means of screws to the plate member 73ᵃ. Upon energization of the heating unit 74 the cylindrical portion 73 opens up, or unwinds, thereby moving the lip 71 which in turn rotates the lever member 38. Rotation of the lever member 38 rocks the switch 55 into circuit making position to start the air supplying means 91.

A second bimetallic power element 100 for use under medium-fire operation is similar in construction to the element 72 and has a split cylindrical portion 101 and a lip 102. The element 100 is actuated by a heating unit 103 similar to the unit 74 and similarly placed. Lead wires 104, 105 extend upward, one from each side of the unit 103, and are connected to the binding posts 85 and 78 respectively. A second lever member 106 is similar to the lever member 38 and has a pair of arms 107, 108 and a cross member 109. The rod 33 extends through aligned apertures in the arms 107, 108 and pivotally supports the member 106 intermediate the arms 39, 40 and under the cross member 41. The arm 107 extends from the rod 33 toward the wall 54, substantially parallel to the arm 39, and has a rounded portion 109ª which is received intermediate the portion 32 and shoulder 42 similarly to the arm 39 but on the opposite side of the centerline of the valve member 15. The arm 107 has its extreme end portion 110, which is away from rod 33 bent inward into the chamber 22, away from the wall 27ª so that it aligns with an adjustable stop member 111 and engages therewith upon upward movement of the portion 110 thereby limiting opening movement of the valve member 15. The member 111 is screw-threadedly secured to a plate-like member 112 secured, as by screws, to the flange 27 and to a flange 113 extending inward from the end wall 54. The other arm 108 of the lever member 106 is bifurcated and extends toward the element 100 and receives the lip 102 between its bifurcated ends. Upon energization of the unit 103, the lip 102 acts to rock the lever member 106 in a manner similar to the rocking of the lever member 38 by the lip 71.

A manually operated valve opening mechanism, generally designated 125, is operable to open the valve member 15 for flow of fuel, and which flow will burn under natural draft conditions. The manual mechanism 125 is particularly adaptable for use in the event of failure of the electrical energy supply by enabling the operator to utilize the burner to a limited extent. The mechanism 125 comprises a rod-like plunger member 126 carried within aligned apertures, one being in the boss 27 projecting inward into the chamber 22 and the other being in the plate member 73ª. The rod-like member 126 has rigidly secured thereto a cam member 128 which is cooperable with a pin 129 rigid with and carried by the valve member 15. Upon rotation of the member 126 in a clockwise direction (see Fig. 3) the pin 129 rides along the cam surface 130 of member 128 until it reaches and falls into a notch 131. The cam end 132 at the time the pin 129 reaches the notch 131 engages the side wall 27ª to prevent movement of the cam member 128 beyond the desired position for manually controlled flow. A helical coil spring 133 is arranged concentrically with and surrounds the plunger member 126 and normally urges the cam member 128 in a counter-clockwise direction (see Fig. 3). Spring 133 has one end 134 bent downward at right angles to the plane of the lower end of the spring 133 and extends into an aperture in the cam member 128. The upper end 135 of the spring 133 engages the side wall 27ª and the underface of the flange 27 so that the spring 133 is held under compression and winding stress, which tends to rotate the cam member 128 in a counterclockwise direction (see Fig. 3). The holding force due to the downward thrust of the valve member 15 holding pin 129 in the notch 131 is sufficient however to hold the cam member 128 and plunger member 126 against rotation by the spring 133 after manual operation of the mechanism 125. However, in the event the electrical energy supply is reestablished and the valve member 15 is moved by either of the power elements 72 or 100, the valve member 15 will have moved to a further open position and the pin 129 moved out of the notch 131 so that the cam member 128 rotates, under the winding stress of the spring 133, into the normal ineffective position out of the path of movement of pin 129, and the valve member 15 again is solely controlled by the power elements 72 or 100. Upon a subsequent power failure, the operation of the apparatus by the manually operable mechanism 125 will require a new manual movement of the mechanism 125. The rod-like plunger member 126 has at its upper end, screw-threadedly secured thereto, an adjustment nut 136 which extends above the cover member 23 and serves as a convenient means for rotating the plunger member 126. The nut 136 has its lower end portion bearing against the upper surface of the flange 27 and limits downward movement of the plunger member 126 caused by the weight of the valve member 15 acting through the pin 129 and the cam member 128, and also the force exerted by the spring 133 acting to expand to its normal length. The nut 136 by its screw-threaded relation with the plunger member 126 acts to determine the vertical position of the member 126 and the connected cam member 128 so that the opening movement of the valve member 15 by the cam surface 130 may be set for any predetermined fuel flow. After adjustment, the nut 136 is held rigid with the plunger member 126 as by a drop of solder, or any other known means for preventing a nut from rotating relative to the rod on which it is screw-threaded.

The apparatus is preferably connected into a heating apparatus, as shown in Fig. 1. The control apparatus 1 is diagrammatically shown and the respective parts are designated by characters of reference corresponding to the parts shown in the other figures of the drawings. Electrical energy is supplied from a suitable source of supply through lead wires 150, 151 to the primary coil 152 of a transformer 153. One side of the transformer secondary 154 is connected by a lead wire 155 to the movable bimetallic element 156 of a room thermostat 157. The element 156 carries two contact members 158, 159 cooperable respectively with stationary contact members 160, 161, the contact members 158, 160 engaging at a predetermined temperature of element 156, and upon a lower predetermined temperature of element 156 the contact members 159, 161 are operable to engage. Engagement of contact members 158, 160 closes a circuit from the transformer secondary 154, through lead wire 155, element 156, contact members 158, 160, lead wire 162 connected to lead wire 75, heating unit 103, lead wire 76, and a lead wire 163 to the other side of the secondary 154. Upon energization of the unit 103, heat begins to flow to the cylindrical portion 101 of the power element 100 and the lip 102 acts to rotate the lever member 106 to lift the valve member 15 until the arm 107 engages the stop member 111. The oil or other fluid fuel will now flow from outlet 9 through conduit 13 to the burner 14, positioned within a furnace 164 or other heat transfer means, and the fuel is burned therein under natural draft conditions. The products of combustion pass through the stack 165 to atmosphere and the heat passes through pipe means 166 to the enclosed space in which the thermostat 157 is located. Should the temperature surrounding the thermostat 157 fall to a predetermined lower temperature, the element 156 will have moved to cause contact members 159, 161 to engage thereby completing an electrical circuit from the secondary 154, through lead wire 155, element 156, contact members 159, 161, a lead wire 173 connected to lead wire 104, and therethrough to energize the heating unit 74. From unit 74 the current flows through lead wire 105 and lead wire 163 to the other side of the secondary 154.

Upon energization of the heating unit 74 the lip 71 will move the lever member 38 to lift the valve member 15 until the protuberance 32 engages the flange 31 of the maximum or high-fire stop member 29. At the same time the lever member 38 moves the rod 45 downward thereby, through the linkage, rotating the tube switch 55 into closed circuit position. Closing of the switch 55 energizes the air supplying means 91 which supplies the necessary air for combustion of the high-fire fuel flow to the burner 14. The circuit is from a source of supply through a lead wire 176, switch 55, a lead wire 177, air supplying means 91, and a lead wire 178 back to the source. The time of closing of the switch 55 relative to the positioning of the valve member 15 is controlled or adjusted by means of the nut member 51.

The operation of my apparatus is as follows: With the thermostat 157 in the position as shown in Fig. 1, the temperature of the room heated by the furnace 164, and in which the thermostat 157 is located, will be at or above a predetermined temperature. In this position the fuel controlling apparatus 1 will be substantially as shown in Fig. 2, and as diagrammatically shown in Fig. 1. The valve member 15 in this position is held partially open by the engagement of the protuberance 32 with the flange 30 of the low-fire stop member 28. Fuel is therefore being supplied from the outlet 9 through conduit 13 to the burner 14 for maintaining the pilot or low-fire operation of the furnace. This pilot fire operation of the burner 14 is intended to maintain a flame at all times in the burner 14 but not to supply sufficient heat to the room heated by the furnace 164 to maintain the room at the desired temperature in any but the very mildest weather. Upon decrease in temperature of the room, the thermostat 157 will move so that the contact members 158, 160 will engage and energize the power element 100. Energization of the power element 100 acts to rotate the lever member 106 into engagement with the medium-fire stop member 111 and to lift the valve member 15 a predetermined amount so that oil is supplied through the conduit 13 to the burner 14 at a higher rate of flow. This medium-fire operation of the burner 14 may be such that the fuel which is supplied thereto is the maximum amount which the burner 14 will burn without the addition of supplementary or forced air. The furnace 164 under medium-fire operation is supplying a greater quantity of heat to the room, and which under moderate outside temperature conditions will be sufficient to maintain the room at least at the predetermined temperature.

Should the heat supplied by the burner 14, operating under medium-fire conditions, not be sufficient to maintain the room temperature at the desired predetermined temperature and the room temperature falls a predetermined amount below this first predetermined temperature, then the element 156 of the thermostat 157 will move the contact members 159, 161 into engagement and the contact members 159, 161 will act to energize the power element 72. Upon energization of the power element 72 the lever member 38 is rotated to lift the valve member 15 in a further open direction and until the protuberance 32 engages the underside of the flange 31 of the high-fire stop member 29. Subsequent to movement of the valve member 15 by the power element 72, but prior to the engagement of the protuberance 32 with the flange 31, the lever member 38 will have acted through the pin 44 and rod 45 to rotate the shaft 52, and thereby the tube switch 55, into circuit making position so that additional air is supplied, by means of the air supplying means 91, to the burner 14. Upon increase in temperature of the room, the thermostat 157 acts first to open the contact members 159, 161, to deenergize the power element 72. Subsequent to deenergization, the power element 72 will cool and allow the valve member 15 to move toward closed position until the protuberance 32 engages the medium-fire lever member 106 which is held by the power element 100 against the medium-fire stop member 111. The nut-member 51 is preferably adjusted so that the switch 55 will not open the circuit between the lead wires 176 and 177 to deenergize the air supplying means 91 until the lever member 38 has moved away from the protuberance 32 toward the shoulder 42 and which movement occurs upon continued cooling of the power element 72. Upon a further increase in temperature of the room the thermostat 157 will act to open the contact members 158, 160 to deenergize the power element 100 so that the valve member 15 will move toward closed position and into engagement with the stop member 28 so that the flow of fuel is again such as to supply a low or pilot-fire operation of the burner 14.

It may be seen that I have provided a fluid fuel controlling system in which I can independently adjust the flow of fuel for three different burner operations, and that I have provided automatic means for regulating the flow of fuel to the burner so that the room or other enclosed spaced heated thereby will be maintained within a predetermined desired temperature range. I have also provided a novel and simple means for adjusting the energization of the supplementary air supplying means so that additional air may be supplied to the burner at any given position of the fuel valve.

What I claim and desire to secure by Letters Patent of the United States is:

1. A control device for liquid fuel burning apparatus comprising a fuel metering valve, means to limit movement of said valve toward closed position, a lever controlling movement of said valve toward closed position and having a lost-motion connection with said valve so that said lever can have continued movement upon limitation of movement of said valve, a shaft rotatable by such continued movement of said lever, and means including a switch operable to reduce the air supply for the apparatus and actuated by said shaft rotation.

2. A control device for liquid fuel burning apparatus comprising a fuel metering valve, means to limit movement of said valve toward closed position, a lever engageable with and operable to control movement of said valve toward closed position, said lever having a lost-motion connection with said valve, a shaft rotatable by said lever subsequent to limitation of movement of said valve, means including a switch operable to reduce the air supply for the apparatus and actuated by said shaft rotation, and automatic means to move said limiting means so that said valve can be moved further toward closed position.

3. In a control device, a valve for controlling the supply of fuel to a burner, a lever having a range of movement and having a lost-motion connection with said valve, means to limit movement of said valve within the range of movement of said lever, means including a switch for controlling the supply of air to the burner and operable by said lever, and means determining the extent of movement of said lever subsequent to limitation of movement of said valve requisite to operate said switch.

4. A control device for the burner of a heating apparatus comprising, a valve operable to control the supply of fuel to the burner, abutment means on said valve, means holding said valve in an open position to supply fuel for a pilot flame, a lever engageable with said abutment means to move said valve further toward open position, means engageable with said lever to limit opening movement of said valve, a second lever engageable with said abutment means to move said valve beyond said limit of movement, and means determining the extent of opening movement of said valve by said second lever.

5. In a control system for a heating apparatus having a burner, a valve controlling the supply of fuel to the burner, abutment means on said valve, means engageable with said abutment means and holding said valve in an open position to supply fuel for a pilot flame, a lever engageable with said abutment means to move said valve further toward open position, means engageable with said lever to limit opening movement of said valve to provide a predetermined limited fuel supply, a second lever engageable with said abutment means to move said valve beyond said limit of movement, a motor driven fan to supply air to the burner, a switch controlling the motor of said fan and operable by said second lever, and means determining the extent of opening movement of said valve by said second lever.

6. In a control system for a heating apparatus having a burner, a valve controlling the supply of fuel to the burner, means holding said valve in an open position to supply fuel for a pilot flame, abutment means on said valve, a lever engageable with said abutment means to move said valve further toward open position, means engageable with said lever to limit opening movement of said valve to provide a predetermined limited fuel supply, a second lever engageable with said abutment means to move said valve beyond said limit of movement, a motor driven fan to supply air to the burner, a switch controlling the motor of said fan and operable by said second lever, means determining the extent of movement of said second lever requisite to operate said switch, and means determining the extent of opening movement of said valve by said second lever.

7. In a control system for a heating apparatus having a burner, a thermostat having a first switch closed upon occurrence of a predetermined temperature and having a second switch closed upon temperature decrease below said predetermined temperature, an electrically energized heat motor controlled by said first switch, a lever engageable by said heat motor, a valve for controlling the supply of fuel to the burner and engageable by said lever for movement thereby toward open position, a stop member engageable by said lever to limit opening movement of said valve, an electrically energized heat motor controlled by said second switch, a lever engageable by said second-named heat motor and engageable with said valve to move said valve further toward open position, and means to limit the maximum opening movement of said valve.

8. In a control system for a heating apparatus having a burner, a thermostat having a first switch closed upon occurrence of a predetermined temperature and having a second switch closed upon temperature decrease below said predetermined temperature, an electrically energized heat motor controlled by said first switch, a lever moved by said heat motor, a valve for controlling the supply of fuel to the burner and operable by said lever for movement thereby toward open position, a stop member engageable by said lever to limit opening movement of said valve, an electrically energized heat motor controlled by said second switch, a lever moved by said second-named heat motor and cooperable with said valve to move said valve further toward open position, means to limit the maximum opening movement of said valve, a motor driven fan for supplying air to the burner, and a switch controlled by said second-named heat motor and controlling the circuit of said fan.

9. In a control device, a housing member having a base portion, a pair of spaced supporting arms located within said housing member and secured to said base portion, a bimetallic heat actuated power element having a substantially cylindrical portion with spaced longitudinal-edge portions and a lip portion extending from said cylindrical portion adjacent one of said edge portions, the other of said edge portions being secured to one of said arms, said cylindrical portion being operable upon being heated to move said one edge portion relative to said other edge portion thereby to move said lip portion, a resistance member for heating said cylindrical portion and positioned within said cylindrical portion, said resistance member having a lead wire, a terminal member having a lead wire terminal and carried by the other of said pair of arms and overlying said power element, said lead wire being connected to said terminal, a shaft member rotatably carried by said housing member and extending intermediate said one arm and said terminal member and being substantially parallel to said base portion, a lever mechanism operably connecting said shaft member and said power element lip portion and being operable upon movement by said power element to rotate said shaft member, and a mercury tube switch means carried by said shaft member, said switch means being operable to control an electrical circuit upon rotation of said shaft member.

10. In a control device, a supporting member, a lever member fulcrumed on said supporting member and having a pair of substantially parallel arm members, a supporting arm carried by said supporting member, a bimetallic heat actuated power element having a substantially cylindrical portion with spaced longitudinal-edge portions substantially facing each other and a lip portion extending from one of said edge portions, the other of said edge portions being secured to said supporting arm, said cylindrical portion being operable upon being heated to move said one edge portion relative to said other edge portion thereby to move said lip portion, said lip portion being operable upon movement to engage one of said arm members and to move said lever member, a valve member having an abutment spaced from and engageable by the other of said arm members, said power element being operable to move said other arm member into engagement with said abutment and to pick up and to move said valve member in opening direction, and an adjustable stop member carried by said supporting member, said other arm member having an extending portion engageable with said stop member to limit movement of said valve member by said lever member in opening direction, said other arm member being freely movable away from said abutment upon limitation of closing movement of said valve member.

11. In a control device, a heat motor, a lever operable by said heat motor, a controlling means movable in one direction by said lever, a stop member to limit movement of said controlling means, a second heat motor, a lever operable by said second heat motor and operable to move said controlling means further in said one direction, means to limit the maximum movement of said controlling means in said one direction, a switch, a longitudinally movable member, an abutment on said movable member engageable by said second-named lever, resilient means continually urging said abutment into engagement with said second-named lever, an abutment member carried by said movable member, means adjustably positioning said abutment member longitudinally relative to said movable member, means engageable with said abutment member and operable upon movement of said movable member for controlling the operation of said switch, and means continually urging said last-named means into engagement with said abutment member.

12. In a control device, a control means, a rotary member operatively connected to and for actuating said means, a lever arm extending from and operable to rotate said member, a longitudinally reciprocal thrust member, means to guide the movement of said thrust member, an abutment member slidable on said thrust member and operatively connected to said arm, a spring interposed between said thrust member and said abutment member, a power element having a position of rest and movable therefrom to actuate said control means, means operatively connecting said power element to said thrust member, and an adjustment member carried by said thrust member and operable to position said abutment member against the force of said spring and relative to said power element position of rest thereby to determine the operation of said control means by said power element.

13. In a control device for actuating an electric switch, a supporting member, a pair of spaced supporting arms extending from said member, an electrically operated power element carried by one of said arms, electric means for energizing said power element, a terminal member having a lead wire terminal and carried by the other of said arms and overlying said power element, a lead wire connecting said electric means to said terminal, a shaft member rotatably carried by said supporting member and extending intermediate said power element and said terminal member, a lever member pivotally supported on said supporting member, said lever member operably connecting said shaft member and said power element and being operable upon movement by said power element to rotate said shaft member, and a switch means operable by rotation of said shaft member.

14. In a control device, a housing member having a base portion, bracket means carried by said base portion and having a pair of spaced supporting arms located within said housing member, a bimetallic power element carried by one of said pair of arms, a resistance member for heating said element, a member having a plurality of terminals carried by the other of said pair of arms and overlying said one arm, lead wires connecting said resistance member to certain of said terminals, a second bracket means carried by said base portion, a second bimetallic power element carried by said second bracket means, a second resistance member for heating said second power element, lead wires connecting said scond resistance member to certain of said terminals, a first lever member pivotally supported on said housing member and operable to be moved by said first-named element, a second lever member pivotally supported on said housing member adjacent said first-named lever member and operable to be moved by said second-named element, a valve member carried in said housing member and having an abutment, means on said first and said second lever member operable to engage said abutment so that each of said lever members is operable upon energization of the respective power elements by the respective resistance members to move said valve member in one direction, stop means carried by said housing member to limit movement of said valve member in said one direction, and stop means carried by said housing member and engageable by said abutment to limit movement of said valve member by said second lever member in said one direction.

15. In a control device, an automatically operable valve having a longitudinally slidable stem, a manually rotatable operating rod extending longitudinally of and closely adjacent said stem, said stem having an abutment rigid therewith and providing a downward-facing bearing surface, a cam member secured to and partially surrounding said rod and having an upper cam surface engageable with said abutment to lift said valve upon rotation of said rod, means on said cam member cooperable with said abutment to hold said rod in rotated valve lifting position, automatic means operable to lift said valve to disengage said abutment from said cam means, and means to rotate said rod to move said cam member out of rotated valve lifting position upon lifting of said valve by said automatic means.

16. In a control device, an automatically operable valve having a longitudinally slidable stem, a manually rotatable operating rod extending longitudinally of and closely adjacent said stem, cooperable cam means on said rod and said stem operable upon rotation of said rod to open and hold open said valve, means to adjust said rod longitudinally to regulate the opening of said valve by said cam means upon rotation of said rod, automatic means to open said valve, and means operable upon opening of said valve by said automatic means to render said cam means ineffective to hold open said valve.

17. In a control device, an automatically operable valve having a longitudinally slidable stem, a supporting member having a bearing aperture therethrough extending parallel to said stem, a manual operating rod reciprocable and rotatable in said aperture, cooperable cam means on said rod and said stem operable upon rotation of said rod to open and hold open said valve, an abutment member longitudinally adjustable on said rod and engageable with said supporting member to support said rod, automatic means to open said valve, and a helical coil spring surrounding said rod and acting to hold said abutment member against said supporting member and to rotate said rod upon opening movement of said valve by said automatic means, thereby to render said cam means ineffective to hold open said valve.

18. In a control device, a supporting member, a lever member carried by said supporting member, a supporting bracket carried by said supporting member, a bimetallic heat actuated power element bent to provide a substantially cylindrical body portion with laterally spaced longitudinal edge portions and with an operating arm extending outward from one of said edge portions, said body portion having all of its length continuously curved from one to the other of said edge portions, means rigidly securing the other of said edge portions to said bracket, said lever member having an end slot providing spaced abutments embracing said operating arm, an electric resistance heater surrounded by said body portion, and control means operable by said lever member.

19. In a control device, a casing, a horizontal supporting shaft secured in said casing, a lever member journaled on said shaft and having an arm with a horizontal end slot, an upstanding bracket having a base portion secured to the base of said casing, a bimetallic heat actuated power element bent to provide a substantially cylindrical body portion with laterally spaced longitudinal edge portions substantially facing each other and with an operating arm extending horizontally from one of said edge portions into said end slot to move said lever member, means rigidly securing the other of said edge portions to said bracket, an electrical resistance heating element positioned within said cylindrical body portion, and control means operable by said lever member.

20. In a control device, a casing, a horizontally pivoted lever member having an arm with an end slot and supported in said casing, an upstanding bracket having a base portion, a second upstanding bracket having a base portion and a horizontal flange overhanging said first bracket, means securing said base portions together and to the base of said casing, a bimetallic heat actuated power element bent to provide a substantially cylindrical body portion with laterally spaced longitudinal edge portions and with an operating arm extending from one of said edge portions into said slot to move said lever member, means rigidly securing the other of said edge portions to said first-named bracket, a terminal block carried by said flange, an electric resistance heater positioned within said cylindrical body portion, lead wires extending from said heater and secured to said block, and control means operable by said lever member.

21. A control device for liquid fuel burning apparatus comprising a fuel metering valve, automatic means for moving said valve partially toward open position, automatic means for continuing the movement of said valve toward open position, and means operable by said second-named automatic means subsequent to initiation of the continuing movement of said valve to increase the air supply to the apparatus.

22. A control device for liquid fuel burning apparatus comprising a fuel metering valve having two stages of opening and closing movement, automatic means controlling one stage of opening and closing movement of said valve, automatic means controlling the second stage of opening and closing movement of said valve, means controlling the air supply to the apparatus, and means operatively connecting said air supply means to said second-named automatic means, said air supply means being so connected and related to said second-named automatic means that said air supply means is actuated to increase the air supply to the apparatus subsequent to initiation of said second stage opening movement and is actuated to decrease the air supply to the apparatus subsequent to said second stage closing movement.

23. In automatically controlling oil burning apparatus of the type having a burner vessel and means for conducting liquid fuel thereto, valve means for controlling the flow of fuel to said burner vessel comprising a casing, a valve member disposed in said casing for movement between open and closed positions, a pair of valve actuating lever elements engaging said valve member to impart opening movement thereto, means in said casing for limiting the degree of movement of one of said lever elements toward a valve opening position, and thermo-responsive means engaging said lever elements and imparting movement thereto.

24. In automatically controlled oil burning apparatus of the type having a burner vessel and means for conducting liquid fuel thereto, valve means for controlling the flow of fuel to said burner vessel comprising a casing, a valve member disposed in said casing for movement between open and closed positions, a pair of valve actuating lever elements engaging said valve member to impart opening movement thereto, means in said casing for limiting the degree of movement of one of said lever elements toward a valve opening position, thermo-responsive means engaging said lever elements, and electric resistance coils disposed adjacent said thermo-responsive means, the introduction of electric current to said resistance coils serving to heat said thermo-responsive means to cause movement of said lever elements and said valve member.

WALTER S. LANDON.